Figure 1:
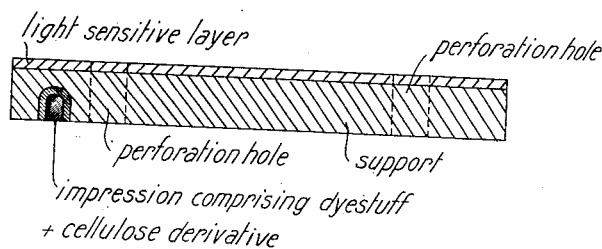

Dec. 11, 1934.  H. LUMMERZHEIM ET AL  1,983,910
INSCRIPTION BEARING FILM AND INK FOR MAKING SAME
Filed July 19, 1928

Patented Dec. 11, 1934

1,983,910

UNITED STATES PATENT OFFICE 1,983,910

INSCRIPTION BEARING FILM AND INK FOR MAKING SAME

Hermann Lummerzheim, Dessau-Ziebigk, and Eduard Schnitzler, Dessau in Anhalt, Germany, assignors to Agfa Ansco Corporation, Binghamton, N. Y., a corporation of New York Application July 19, 1928, Serial No. 294,053
In Germany August 12, 1927

8 Claims. (Cl. 95—1.1)

The present invention relates to a process and an ink for providing photographic raw film with inscriptions capable of being printed by exposure to light onto light-sensitive layers and to raw films produced according to this process. Its object is to improve the inscriptions applied to the rear side of the film by printing it by means of a solution of a dyestuff in a solvent which is but little volatile. Another object is the film provided with an inscription according to our process.

In our Patent No. 1,828,974, dated October 27, 1931, we have disclosed that photographic raw films can advantageously be provided with opaque inscriptions by impressing the letters or symbols upon the rear side of the support for the sensitized layer and by using for printing a dye solution which penetrates into the interior of the support and dries in a few minutes. For the purpose of printing on film, these two features, viz., penetration of the solution into the support and high drying speed are essential in order that the printing process can be carried out continuously and that the impression may not be damaged by the usual after-treatment of, for instance, motion picture film with polishing solvents. For this purpose according to our aforesaid patent solutions of dyes in slowly evaporating solvents are used which, however, are solvents or swelling agents for the supporting layer and which are able to penetrate into the latter. In this way the liquid when printed upon quickly disappears from the surface of the support because it penetrates together with the dye dissolved in it into the inner strata of the support.

The present invention is an improvement of this process and consists in adding to the solution of the dye a colloid which is insoluble in any liquid which may be used in the subsequent treatment of the film, particularly in the polishing operation. By the addition of such a colloid to the solution of the dyestuff the colored impression obtained is not faded out by the later application of solvent, so that the dyestuff is not removed from the celluloid by such solvent.

For the purpose of the invention there may be used any colloid which has the desired properties in respect of solubility and has no ill-effect upon the photographic emulsion. Cellulose-derivatives are to be preferred. It may be particularly advantageous to use amino-derivatives of cellulose, for these are known to have an enhanced affinity to certain dyestuffs.

When the printing solution contains a colloid there may be substituted wholly or in part for the soluble dyestuff an insoluble pigment which is finely dispersed in the solution.

The following example illustrates the invention:

100 parts by weight of a cold saturated solution of cerasine red in glycol acetate are mixed with 50 parts of a solution of acetyl cellulose in glycol acetate of 5 per cent. strength and the mixture is used for printing on a nitrocellulose film.

In the preceding example the acetyl cellulose may be replaced by any amino-derivative of cellulose having suitable solubility-properties.

If the printing solution is to be made without a soluble dyestuff 1 part by weight of soot may be carefully rubbed up with 30 parts of glycol acetate and the whole mixed with 15 parts of a solution of cellulose acetate in glycol acetate of 5 per cent. strength.

Figure 2:
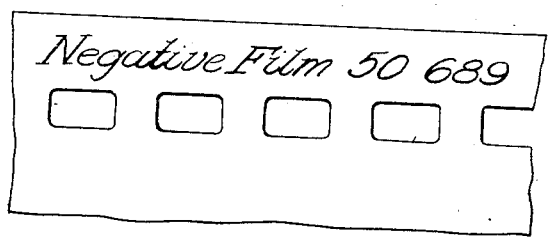

The invention is illustrated by the accompanying drawing in which Fig. 1 is a cross section of a film on an enlarged scale and Fig. 2 is a plan view of a film strip bearing inscriptions on the rear side. As seen from the cross section illustrated in Fig. 1, the dye preparation forming the imprint forms an inner zone mainly consisting of the dye in combination with a colloid surrounded by an outer zone mainly consisting of the dye in combination with a colloid and with the film base. These details are shown on an exaggerated scale. Practically well defined inscriptions are obtained since the blending on the edges of the imprints is not recognizable by the naked eye.

We claim:

1. Photographic raw film comprising a support and on the front side of said support a photographic emulsion, the rear side of said support bearing photographically printable inscriptions consisting of a dye in combination with a colloid both having deeply penetrated the inner strata of the support, said dye in combination with said colloid being fast to the action of the liquids which are used in the subsequent treatment of the film.

2. Photographic raw film comprising a support and on the front side of said support a photographic emulsion, the rear side of said support bearing photographically printable inscriptions consisting of a dye in combination with a cellulose derivative both having deeply penetrated the inner strata of the support, said dye in combination with said cellulose derivative being fast to the action of the liquids which are used in the subsequent treatment of the film.

3. Photographic raw film comprising a support and on the front side of said support a photographic emulsion, the rear side of said support bearing photographically printable inscriptions consisting of a dye in combination with acetylcellulose both having deeply penetrated the inner strata of the support, said dye in combination with acetlycellulose being fast to the action of the liquids which are used in the subsequent treatment of the film.

4. An ink for affixing photographically printable inscriptions on the rear side of a film which comprises a dye in combination with a colloid and a solvent for said colloid and said film, said dye in combination with said colloid being fast to the action of the liquids which are used in the treatment of the film.

5. An ink for affixing photographically printable inscriptions on the rear side of a film which comprises a mixture of 100 parts by weight of a cold saturated solution of cerasine red in glycol acetate and 50 parts by weight of a solution of acetylcellulose in glycol acetate of 5 per cent strength.

6. An ink for affixing photographically printable inscriptions on the rear side of a film which comprises a mixture of 1 part by weight of soot carefully rubbed up with 30 parts by weight of glycol acetate and 15 parts by weight of a solution of cellulose acetate in glycol acetate of 5 per cent strength.

7. Photographic raw film comprising a support and on the front side of said support a photographic emulsion, the rear side of said support bearing photographically printable inscriptions consisting of a coloring material selected from the group consisting of dyes and finely divided pigments in combination with a colloid which has deeply penetrated the inner strata of the support, said dye in combination with said colloid being fast to the action of the liquids which are used in the subsequent treatment of the film.

8. An ink for affixing photographically printable inscriptions on the rear side of a film which comprises a coloring material selected from the group consisting of dyes and finely divided pigments in combination with a colloid and a solvent for said colloid and said film, said dye in combination with said colloid being fast to the action of the liquids which are used in the subsequent treatment of the film.

HERMANN LUMMERZHEIM.
EDUARD SCHNITZLER.

DISCLAIMER 1,983,910.—*Hermann Lummerzheim*, Dessau-Ziebigk, and *Eduard Schnitzler*, Dessau in Anhalt, Germany. INSCRIPTION BEARING FILM AND INK FOR MAKING SAME. Patent dated December 11, 1934. Disclaimer filed June 19, 1939, by the assignee, *Agfa Ansco Corporation*.

Hereby disclaims claims 1 and 7 of said Letters Patent.

[*Official Gazette July 11, 1939.*]